United States Patent [19]

Ikeda et al.

[11] Patent Number: 4,841,459
[45] Date of Patent: Jun. 20, 1989

[54] TEMPERATURE INDICATING CONTROL APPARATUS HAVING DATA STORING FUNCTION

[75] Inventors: Go Ikeda, Susono; Kiyoshi Sasaki, Mishima; Hiroshi Kumazaki; Shigeru Fujita, both of Numazu; Hideo Banzai, Mishima, all of Japan

[73] Assignee: Toshiba Kikai Kabushiki Kaisha, Tokyo, Japan

[21] Appl. No.: 849,424

[22] Filed: Apr. 8, 1986

[51] Int. Cl.⁴ .................. G06F 19/46; F27D 3/00
[52] U.S. Cl. ..................... 364/557; 364/162; 364/476
[58] Field of Search ............ 364/557, 162, 709, 557, 364/550, 162, 476

[56] References Cited

U.S. PATENT DOCUMENTS

| | | | |
|---|---|---|---|
| 4,090,247 | 5/1978 | Martin | 364/900 |
| 4,094,940 | 6/1978 | Hold | 364/476 |
| 4,663,710 | 5/1987 | Waugh et al. | 364/400 |
| 4,674,053 | 6/1987 | Bannai et al. | 364/476 |
| 4,675,826 | 6/1987 | Gentry et al. | 364/557 |
| 4,688,180 | 8/1987 | Motomiya | 364/557 |
| 4,692,216 | 9/1987 | Polansky et al. | 364/557 |

FOREIGN PATENT DOCUMENTS

| | | |
|---|---|---|
| 1911426 | 3/1969 | Fed. Rep. of Germany . |
| 2609640 | 3/1976 | Fed. Rep. of Germany . |
| 3024275 | 6/1980 | Fed. Rep. of Germany . |
| 3335219 | 9/1983 | Fed. Rep. of Germany . |

OTHER PUBLICATIONS

Henry M. Morris (Control Engineering/Mar. 1987), Operator Convenience is Key as Process Controllers Evolve, pp. 65–70.

Primary Examiner—Parshotam S. Lall
Assistant Examiner—Ellis B. Ramirez
Attorney, Agent, or Firm—Stevens, Davis, Miller & Mosher

[57] ABSTRACT

In an apparatus for indicating and controlling temperature at a plurality of positions, under the control of a function selecting device, set data stored in a data memory are transferred to a current memory and indicated in a plurality of indicators. A control device calculates control values based on the set values and sensed values, and delivers outputs for controlling the temperatures. When the function selecting device selects remote operation, the apparatus may be operated by a host computer and the like.

5 Claims, 3 Drawing Sheets

TEMPERATURE INDICATING CONTROL APPARATUS HAVING DATA STORING FUNCTION

BACKGROUND OF THE INVENTION

This invention relates to a temperature control apparatus applicable to injection molding machines, extruding machines, die casting machines and the like, and more particularly to a temperature indicating control apparatus having a data storing function, in which data required for controlling the temperature of the machine can be transferred smoothly and in an assured manner regardless of whether a host computer or a process control apparatus is therewith provided or not.

Heretofore, temperature indicating control apparatus used for controlling the temperature of various devices have been constructed such that the set data can be transferred as desired (instantaneous alteration of set values) under the direct control (DDC method) of a host computer or the data transfer control of a process control apparatus. Thus, in a case where one or more of the temperature indicating control apparatus are used, instantaneous setting of data in these apparatus could not be executed without aid of the host computer or the process control apparatus. The provision of the host computer and the like for realizing the instantaneous setting entails the difficulty of requiring an extremely high cost.

SUMMARY OF THE INVENTION

A primary object of the invention is to provide a temperature indicating control apparatus having a data storing function, wherein data required for controlling the temperature can be set instantaneously regardless of the presence or not of the host computer or the process control apparatus.

Another object of the invention is to provide a temperature indicating control apparatus having a data storing function, so constructed that the set data can be transferred smoothly and in an assured manner.

These and other objects of the invention can be achieved by a temperature indicating control apparatus for indicating and controlling temperatures of a plurality of positions, comprising a device for setting data required for controlling the temperatures of the plurality of positions, a plurality of indicators for indicating the set data, a control device for calculating control values for controlling temperatures of the plurality of positions based on the set data and detected values of the temperatures of the plurality of positions, an input and output device for receiving aforementioned detected values from outside sensors and delivering the control values to outside control elements, means for selecting functions of the indicating control apparatus, a data memory for storing a sufficient amount of data required for controlling the temperatures of the plurality of positions, a current memory for storing presently set data, and means for controlling the indication of the plurality of indicators and the transfer of the memorized data in accordance with the operating results of the function selecting means.

The device for setting data may comprise ten keys and a set-value indicator. Preferably, the function selecting means comprises LOCAL, REMOTE, MONITOR, SET, STORE and LOAD operation selecting keys. When the REMOTE key is operated, the remaining keys except the LOCAL key are all made inoperative, and the current memory is controlled by an outside host computer and the like. However, when the LOCAL key is operated, any one of other keys may be depressed, selectively according to the kinds of control desired.

DESCRIPTION OF THE PREFERRED EMBODIMENTS

Figure 1:
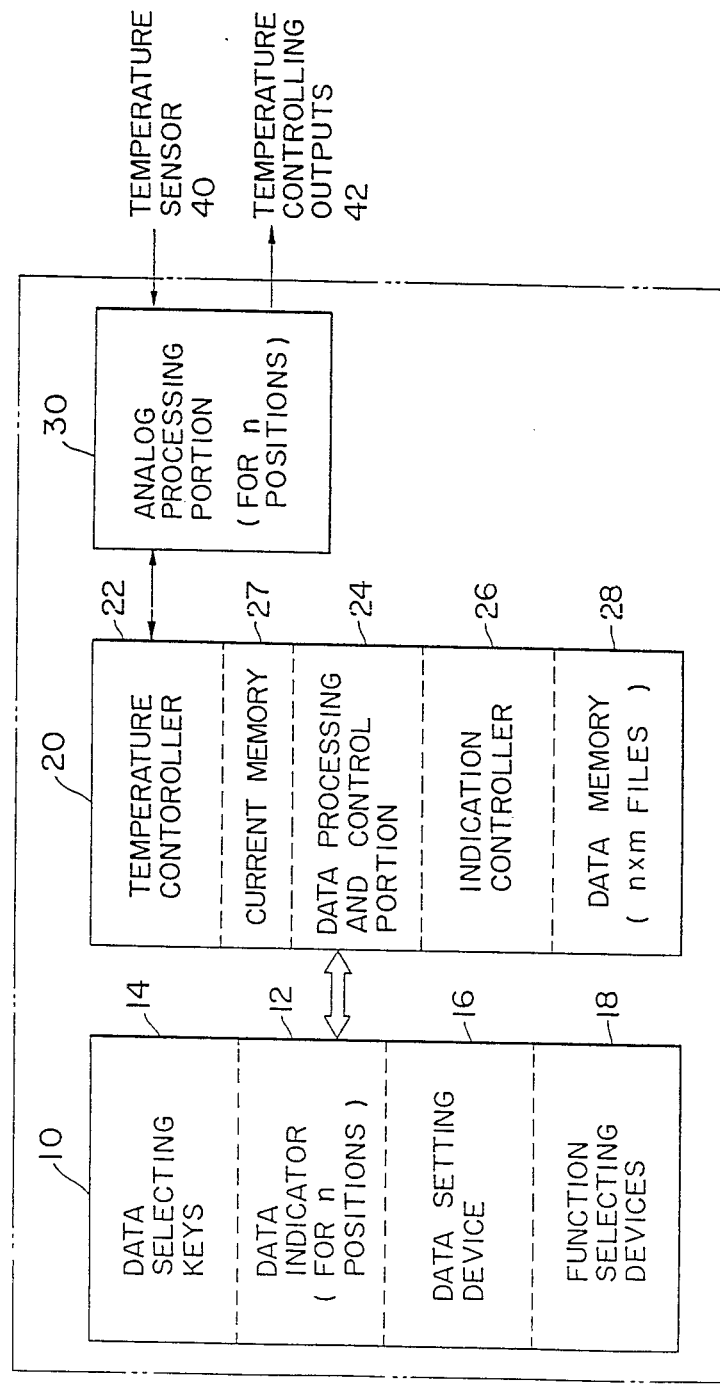
FIG. 1 is a diagram showing the basic construction of the temperature indicating control apparatus having a data storing function, which constitutes a preferred embodiment of this invention.

The invention will now be described in detail with reference to FIGS. 1-5. FIG. 1 illustrates a basic construction of the invention, which comprises a data setting portion 10, a control portion 20, and an analog control portion 30. The data setting portion 10 in turn comprises a number of indicators 12 capable of indicating data related to a plurality of positions, data selecting keys 14 adapted to select controlling constants, a data setting device 16 for setting values of the data, and a function selecting device 18 for selecting the function of the control apparatus. The control portion 20 on the other hand comprises a temperature control device 22, a data processing device 24, an indication control device 26, a current memory 27, and a data memory 28 (having n×m files). The analog control portion 30 in turn is so constructed that it is capable of analog-processing data for n positions, receiving and transferring inputs from outside sensors 40 to the control portion 20, and delivering the outputs 42 from the control portion 20 to outside control elements.

Figure 2:
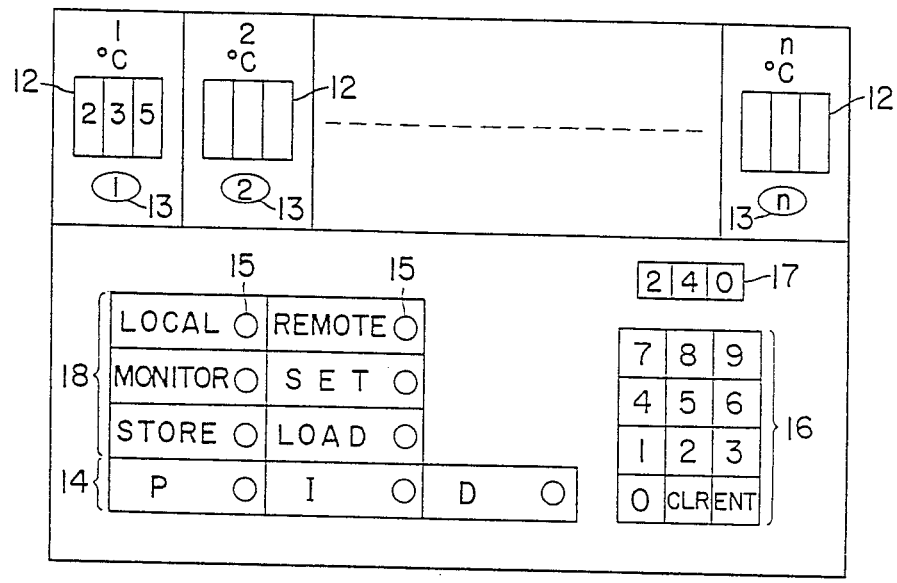
FIG. 2 is a diagram showing one example of an indicating panel constituting one part of the temperature indicating control apparatus of this invention.

FIG. 2 is a diagram showing a practical example of the data setting portion 10 of the embodiment shown in FIG. 1. In this example, data indicators 12 of a number n, each comprising luminous diodes indicating, for instance, three digits are arranged on the upper part of a data indicating panel. Each indicator 12 is further provided with a push-button switch 13 of also luminous type, for letting the control portion 20 recognize the position of the data now to be indicated.

Downwardly from the indicators 12 and the push-button switches 13, there is provided a data setting device 16 comprising ten keys (0-9) as well as an input key ENT and an erasing key CLR. A set-value indicator 17 having a number of digits equal to that of the data indicator 12 is also provided near the data setting device 16 for confirming the setting operation of the data setting device 16.

Preferably on the left side of the data setting device 16 is provided a function selecting device 18 including keys for selecting LOCAL, MONITOR, STORE, RE- MOTE, SET and LOAD operations, each key having an indicating lamp for indicating the selection of the function represented by the key. In addition to the provision of the function selecting device 18, there are also provided data selecting keys 14, which are operated in association with the SET selection of the function selecting device 18, so as to set constants of the proportional term P, integrating term I and differentiation term D of the temperature control.

The data setting portion 10 of the above described construction operates as follows.

When a key of the function selecting device 18 for selecting LOCAL operation of the control apparatus is operated, a lamp 15 provided therewith is turned ON, and the control apparatus is disconnected from the host computer or the process control unit. At this state, the data setting device 16, function selecting device 18 and the data selecting keys 14 are made operable, and the temperature control apparatus of this invention is operated independently for controlling the temperature of an object apparatus such as an injection molding machine and the like.

The LOCAL key and the REMOTE key are operated alternately either one at a time, and when the REMOTE key also having an indicating lamp 15 is operated, the temperature control apparatus is connected with the host computer or the process control unit, with the data being transferred therebetween utilizing one or more of the m files of the data memory 28. In this case, not only the set values of temperature, but also current values of temperature monitored periodically by the temperature control apparatus can be transmitted to the host computer and the like. Furthermore, even in the case where the LOCAL key is operated, under the instruction from the host computer, the connection may be changed from the LOCAL operation to the REMOTE operation where the apparatus is operated by the host computer and the like, and hence the monitored values are also transmitted to the same.

As described before, in the operating state of the LOCAL key, all the keys 14, 16 and 18 are made operable, while in the operating state of the REMOTE key, all the keys 14, 16 and 18 are made inoperative, and the memories 27 and 28 in the control portion 20 are operated by the host computer. The current memory 27 in the control portion 20 memorizes current set values and conditions of the apparatus entirely, and when the set values are changed by the operation of the setting keys, the contents of the current memory 27 are also changed. When the MONITOR key is operated in the operating state of the LOCAL key, the present set value, which is indicated in the set-value indicator 17, is periodically revised under the control of the indication control device 26 and the data processing device 24 both provided in the control portion 20 of the apparatus.

When the SET key in the function selecting device 18 is operated, the lamp provided therewith is turned ON, while the lamps provided with the LOCAL and MONITOR keys are turned OFF, and the temperature set value is indicated in the corresponding one of the data indicators 12. That is, a value 235° C. is indicated in the No. 1 indicator of FIG. 2. More specifically, the data related to the set value of the temperature memorized in the current memory 27 of the control portion 20 is transferred to the data indicator 12 of the data setting portion 10. In this case, if it is desired to change the set value or to set a new value, a desired one of the luminous push-button switches 13 accompanying the data indicators 12 is depressed, and a desired value of temperature is inputted by operating ten keys of the data setting device 16. The inputted value indicated in the set-value indicator 17 is transferred to the current memory 27 upon depression of the ENT key, and at the same time the input value is indicated in the indicator 12 as a newly set value. The CLR key in the data setting device 16 is used for correcting the input value indicated in the set-value indicator 17. For instance, when the set value 235° C. indicated in the No. 1 indicator 12 is desired to be revised, the push button switch 13 provided with the No. 1 indicator 12 is depressed, and the ten keys provided in the data setting device 16 are depresed in the sequence of 2→4→0. Thus a value 240 is indicated in the set-value indicator 17, and upon depression of ENT key, the previously set value 235° C. stored in the current memory 27 is replaced by the newly set value 240°, and this value is simultaneously indicated in the No. 1 indicator 12 as described above. The set values indicated in the subsequent data indicators 12 may also be revised in the same manner as described above.

Also under the condition of operating the SET key, the constants corresponding to the proportional term P, integration term I and the differentiation term D of the temperature control can be set or revised by use of the data selecting keys 14. For instance, when one of the keys 14 corresponding to the proportional term P is depressed, the values of the proportional terms P of the temperature controls at n positions of the controlled apparatus are indicated in the indicators 12. The values of the proportional term P indicated in the indicators 12 can be revised in a manner similar to that described for the revision of the set values. The setting and revision of the constants of the integration term I and the differentiation term D are also carried out in the same manner as described above by operating the I term key and the D term key, respectively.

When the STORE key of the function selecting device 18 is operated, the indicating lamp provided therewith is turned ON, and at the same time the file number of the data memory 28, in which the setting value has been previously stored, is indicated in the set-value indicator 17. Thus, by operating the ten keys for designating subsequent file numbers successively, and then operating the ENT key, all of the set values can be stored in the data memory 28 at the desired file numbers 1-m.

Likewise when the LOAD key of the function selecting device 18 is operated for loading the current memory 27, the indicator lamp is turned ON, while the file number previously loaded is indicated in the set-value indicator 17. Thus, by operating the ten keys for designating subsequent file numbers successively and then operating the ENT key, the contents of the current memory 27 are replaced by the set values stored in the data memory 28 at the designated file numbers. In this case, the indications of the indicators 12 are also revised.

Figure 3:
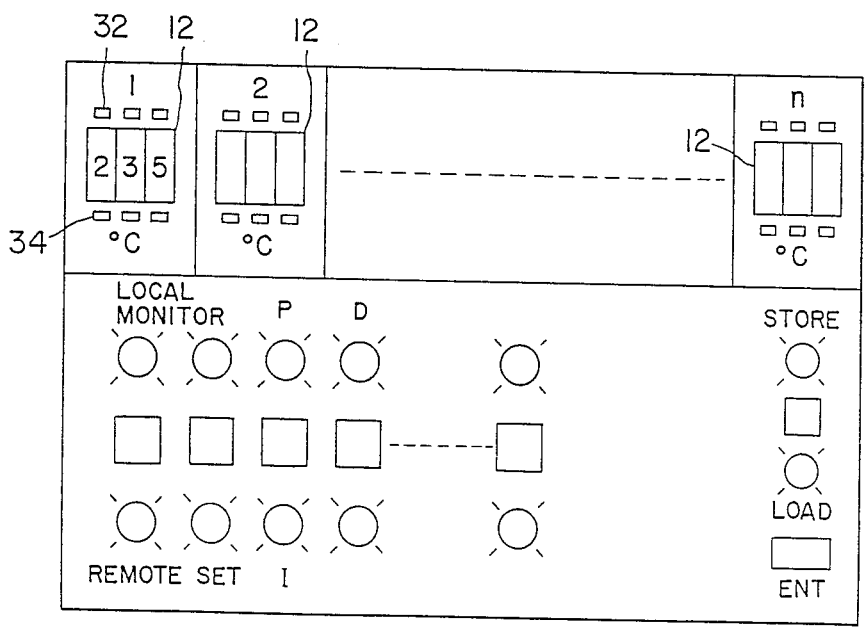
FIG. 3 is a diagram showing another example of the indicating panel used in the temperature indicating control apparatus of this invention.

FIG. 3 illustrates another example of the data setting portion 10 wherein are provided a plurality of data indicators 12 of electronic digital indicating type. Data increment switches 34 for increasing the indicated data and data decrement switches 32 for decreasing the indicated data are provided downwardly and upwardly of the data indicators 12. By use of the switches 32 and 34, the setting operation of the data can be carried out directly. That is, the data can be set without using the ten keys 16 and the set-value indicator 17 as shown in FIG. 2 so that the construction of this example is simplified over that of FIG. 2. Besides the above described indicators and switches, there are provided the function selecting keys such as LOCAL, REMOTE, MONITOR, SET, STORE and LOAD keys, data selecting keys for selecting P, I and D terms of the temperature control, and the ENT key. When all of these keys except the ENT key are made into push-button switches of the luminous type, the data in this example can be set in a manner quite similar to the example shown in FIG. 2.

Furthermore, when the functions of reading out the data indicated in the indicators 12 at a predetermined timing and memorizing the readout data in the current memory 27 are imparted to the data processing and control portion 24 and the indication processing and control portion 26, the ENT key becomes unnecessary, and the construction of the data setting portion 10 is so far simplified.

Figure 4:
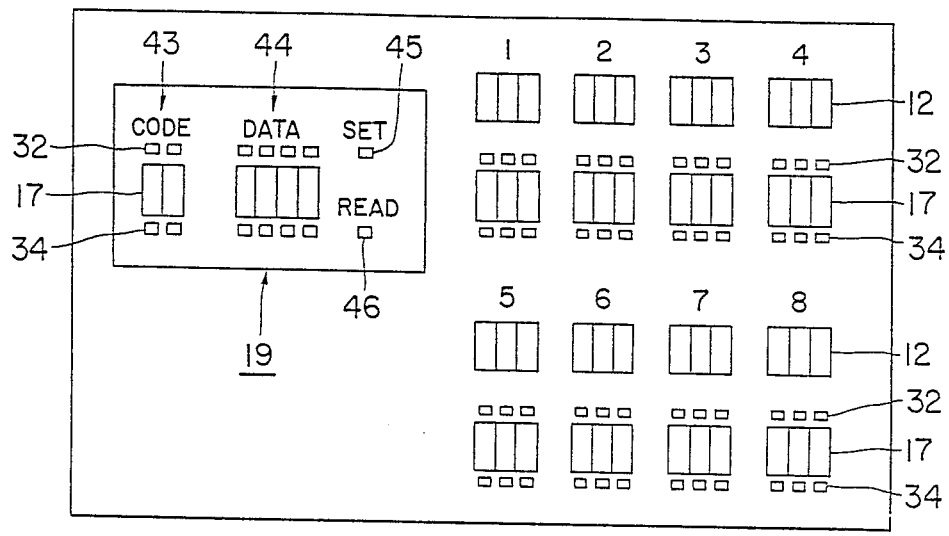
FIG. 4 is a diagram showing still another example of the indicating panel.

FIG. 4 illustrates still another example of the data setting portion 10 which is operable to handle eight zones by a single unit. The portion 10 comprises eight indicators 12 and eight set-value indicators 17 corresponding to the eight zones to be controlled. A data increment switch 34 and a data decrement switch 32 are provided downwardly and upwardly of each set-value indicator 17. The data setting portion further comprises a selection control portion 19 which in turn comprises a code selecting portion 43 that designates both of the controlling data and operational functions in the form of code numbers, and a data portion 44 which sets the control data and the operational functions according to the code numbers. Either of the code selecting portion 43 and the data portion 44 comprises a set-value indicator 17, a data increment switch 34, and a data decrement switch 32 as in the case of the eight zone set-value indicators 17. The selection control portion 19 further comprises a SET key 45 which is operable to input all the values set by the data portion 44 into the data memory 28 so as to be stored therein, and also a READ key 46 which reads out data stored in the area of the data memory 28 designated by the code delivered from the code selecting portion 43 so that the data are thereafter transferred and stored in the current memory 27.

The temperature indicating control apparatus having the data setting portion 10 as described above is operable such that either the temperatures detected at the respective zones or the temperature differences between the detected values and the set values are indicated constantly in the indicators 12, depending on the operational mode selected by the code selecting portion 43.

Besides the above described operation, either of the data set values, alarming values, as well as the proportional-term, integrating term and differentiation term constants can be indicated constantly in the indicators 17 depending on the mode selected by the code selecting portion 43. As a consequence, the detected data and the set data can be indicated simultaneously in the indicators 16 and 17, and the controlling condition of the control apparatus can be observed easily. Furthermore, since the selection control portion 19 comprises the code selecting portion 43 and the data portion 44, the size of the data setting portion 10 can be substantially reduced.

Figure 5:
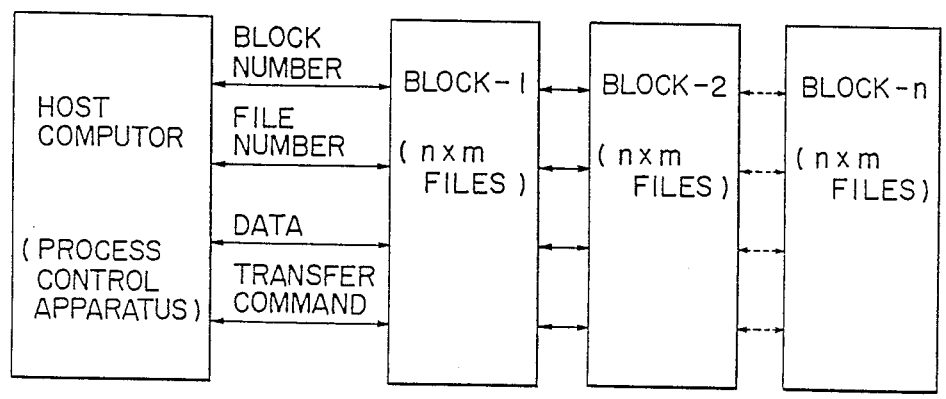
FIG. 5 is a diagram showing a data transfer operation between a plurality of temperature indicating control apparatus according to this invention and a host computer or a process control apparatus.

FIG. 5 illustrates another embodiment wherein a plurality of temperature indicating control apparatus (BLOCK-1 to BLOCK-n) are used together with a host computer or a process controlling apparatus. In this embodiment, data are transferred between the host computer or the process controlling apparatus and the temperature indicating control apparatus (BLOCK-1 to BLOCK-n) in the form of (1) block numbers such as BLOCK-1 to BLOCK-n, (2) file numbers from 1 to m, (3) data such as set values and detected values, and (4) transfer instructions for storing and loading the data. More specifically, the data transfer operations are carried out as follows.

(1) Loading of file data from the host computer or process control apparatus to the panel of the temperature indicating control apparatus is carried out under an instruction made of block number+file number+loading command.

(2) The data are transferred from the host computer or process control apparatus to the temperature indicating control apparatus and stored in the files of the control apparatus under an instruction constituting block number+file number+data+storing command.

(3) The data are transferred from the temperature indicating control apparatus to the host computer or process control apparatus under an instruction constituting block number+file number+data+transferring command.

As is apparent from the above description of the invention, the apparatus of this invention comprises a plurality of data indicators, a data setting device, data selecting keys, and function selecting keys, and therefore setting and alteration of data can be carried out directly and in a simple manner. Furthermore, since a current memory and a data memory are provided in the apparatus of this invention, all the data to be set are stored in the predetermined files of said data memory, and the data can be easily transferred from the data memory to the current memory, so as to be indicated in the indicators.

In addition, the data can be set instantaneously even in a case where the apparatus of the invention is used independently as a single unit, and when a host computer or a process control apparatus is used with the apparatus of this invention, the data can be transferred between the apparatus and the computer without requiring any additional devices.

Although the invention has been described with respect to preferred embodiments thereof, it will be apparent to those skilled in the art that various modifications or alterations thereof can be carried out without departing from the scope of the present invention which is defined in the attached claims.

What is claimed is:

1. A temperature indicating control apparatus for indicating and controlling the temperatures of a plurality of positions of a device, comprising:

a setting device for setting set data required for controlling the temperatures of the plurality of positions;

a plurality of indicators for selectively indicating plural groups of the set data or detected values of the temperatures of the plurality of positions, each of said plurality of indicators being of a plural digit type, and being accompanied by an increment switch and a decrement switch both operable as the setting device, a calculating device for calculating control values for controlling temperatures of the plurality of positions based on the set data and the detected values;

an input and output device for receiving said detected values from outside sensors and delivering said control values to outside control elements;

a function selecting device for selecting a LOCAL operation and a REMOTE operation; and a data memory for storing said plural groups of set data required for controlling the temperatures of the plurality of positions;

a current memory for storing set data which is currently used for controlling temperatures of the plurality of positions; and means for controlling the indication of said plurality of indicators and the transfer of the set data between said data memory and said current memory in accordance with the operating results of said function selecting means, wherein said function selecting means comprises LOCAL, REMOTE, MONITOR, SET, STORE and LOAD operation selecting keys, said function selecting means comprises keys which designate a code number of functions of LOCAL, REMOTE, MONITOR, SET, STORE and LOAD, and said function selecting means are constructed such that when the REMOTE key is operated, the MONITOR, SET, STORE and LOAD keys are made inoperative and said current memory is controlled by an outside computer and the like, while when the LOCAL key is operated, any one of the aforementioned keys is made operable.

2. An apparatus according to claim 1 wherein said function selecting means are further constructed such that when said LOCAL and SET keys are operated, presently set values stored in said current memory are indicated in said plurality of indicators, and the indicated set values can be revised by use of said data setting device.

3. An apparatus according to claim 2 wherein said function selecting means are further constructed such that when said STORE key is operated, the data set by said data setting device are stored in said data memory, and when said LOAD key is operated, the data stored in said data memory are loaded in such current memory at file numbers designated by said data setting device.

4. A temperature indicating control apparatus for indicating and controlling the temperatures of a plurality of positions of a device, comprising:

a setting device for setting set data required for controlling the temperatures of the plurality of positions;

a plurality of indicators for selectively indicating plural groups of the set data or detected values of the temperatures of the plurality of positions, each of said plurality of indicators being of a plural digit type, and being accompanied by an increment switch and a decrement switch both operable as the setting device, a calculating device for calculating control values for controlling temperatures of the plurality of positions based on the set data and the detected values;

an input and output device for receiving said detected values from outside sensors and delivering said control values to outside control elements;

a function selecting device for selecting a LOCAL operation and a REMOTE operation; and a data memory for storing said plural groups of set data required for controlling the temperatures of the plurality of positions;

a current memory for storing set data which is currently used for controlling temperatures of the plurality of positions; and means for controlling the indication of said plurality of indicators and the transfer of the set data between said data memory and said current memory in accordance with the operating results of said function selecting means, wherein said function selecting means comprises LOCAL, REMOTE, MONITOR, SET, STORE and LOAD operation selecting keys, said function selecting means comprises keys which designate a code number of functions of LOCAL, REMOTE, MONITOR, SET, STORE and LOAD, and said function selecting means further comprises keys for selectively setting proportional, integrating and derivative control constants, either one of the keys being made operable after the depression of the LOCAL and SET keys.

5. A temperature indicating control apparatus for indicating and controlling the temperatures of a plurality of positions of a device, comprising:

a setting device for setting set data required for controlling the temperatures of the plurality of positions;

a plurality of indicators for selectively indicating plural groups of the set data or detected values of the temperatures of the plurality of positions, each of said plurality of indicators being of a plural digit type, and being accompanied by an increment switch and a decrement switch both operable as the setting device, a calculating device for calculating control values for controlling temperatures of the plurality of positions based on the set data and the detected values;

an input and output device for receiving said detected values from outside sensors and delivering said control values to outside control elements;

a function selecting device for selecting a LOCAL operation and a REMOTE operation; and a data memory for storing said plural groups of set data required for controlling the temperatures of the plurality of positions;

a current memory for storing set data which is currently used for controlling temperatures of the plurality of positions; and means for controlling the indication of said plurality of indicators and the transfer of the set data between said data memory and said current memory in accordance with the operating results of said function selecting means, wherein said function selecting means comprises LOCAL, REMOTE, MONITOR, SET, STORE and LOAD operation selecting keys, said function selecting means comprises keys which designate a code number of functions of LOCAL, REMOTE, MONITOR, SET, STORE and LOAD, and when said function selecting means is operated suitably, either one of the temperatures of said plurality of positions detected by said sensors or the temperature differences between the detected values and the set values are indicated constantly in said plurality of indicators.

* * * * *